Feb. 27, 1968  C. J. HERMAN  3,371,237
COIL RETAINING STRUCTURE
Filed June 28, 1965

Inventor:
Clairmont J. Herman,
by Howard D. Schlanker
His Attorney

3,371,237
COIL RETAINING STRUCTURE

Clairmont J. Herman, Schenectady, N.Y., assignor to General Electric Company, a corporation of New York
Filed June 28, 1965, Ser. No. 467,525
4 Claims. (Cl. 310—214)

ABSTRACT OF THE DISCLOSURE

Slot wedging means consisting of at least one slug of resilient material is inserted in the slot of electrical apparatus between the coil and the slot teeth.

---

Figure 1:
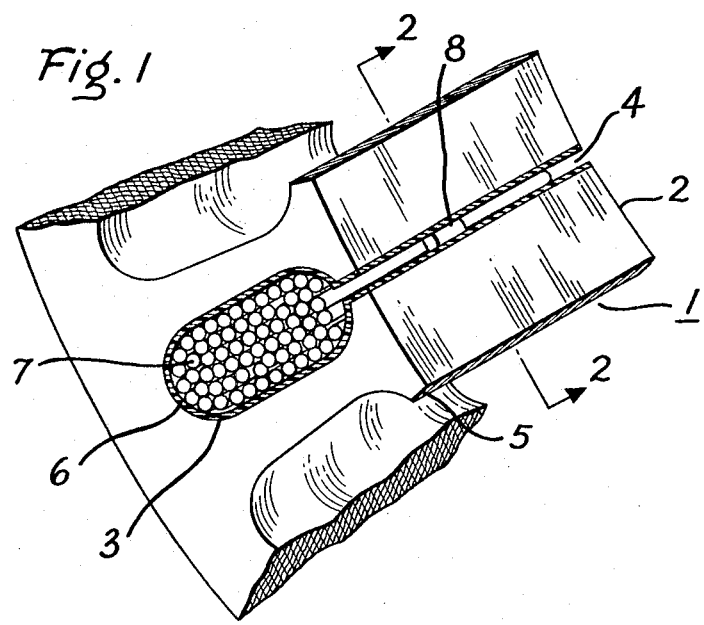

This invention relates to electric motors. More particularly, it relates to means for retaining the coils of electrodynamic machine stators and rotors fixed within their slots.

Various means have in the past been employed to retain the coils of motors and other electrical equipment or apparatus fixed within the slots of rotors or stators, such means being known commonly as slot wedges which may take the form of flat pieces of glass fabric, wood, fiber, paper and the like which may be treated with impregnants. In some instances, such wedges are made in the form of channels which, after emplacement of the coil, are slid through the slot over the wires to prevent their springing or migrating out of the slots before varnish treatment of the windings and later during operation of the machine. In some instances, the wedging function is combined with the so-called slot cells, such slot cells being in the form of sheet insulation which serves to line the complete slot, the slot cell projecting from the face of the slot and being overlapped and forced into the slot and over the coil after insertion of the latter. The purpose of the slot wedging, in addition to retaining the coils within their respective slots, is to retain the individual wires or conductors of the coils in fixed position relative to each other and to the slot coils so that vibration due to alternating electrical current, centrifugal force or other force is held to a minimum. It would be quite evident that if such vibration is not damped, the electrically or mechanically induced vibrations cause the individual conductors to rub one against the other and against the slot cells, abrading away the conductor insulation and causing short circuiting or grounding of the coils and failure of the machine.

While slot wedges such as those described above are useful in confining coils, reducing vibration and preventing electrical failure, they leave much to be desired. Generally, such slot wedges are non-resilient or of fixed shape, being forcibly driven into the slot to compress the coil and confine it within the slot. Because such coils are often of non-uniform construction and contain dissimilar cross sections of conductor bundles, it will be realized that by their irregular nature, true confinement of the coils and prevention of vibration with slot wedges of fixed cross section is physically difficult and costly. While form wound coils are more regular in cross-section, they, too, require adequate wedging. In many cases, particularly where channel-shaped slot wedges as of resin sheet, impregnated glass fabric or fibers are used, the slot wedge serves primarily to prevent migration of the coil conductors through the slot openings, the coil itself being relatively free to vibrate within the rotor or stator slot. Since such slot wedges are required for the entire length of the slot in order to accomplish their purpose, large amounts of wedge material are necessary, adding to the cost of the machine. For example, for a 32-slot motor stator having two inches of stacked laminates of magnetic material, a total of about six feet of wedges is used allowing for slight projection beyond the slot ends. From the above it will be quite evident that there is a difinite need for improved slot wedging means for motor coils or for coils of electrodynamic machines which are relatively simple, are economic and efficiently retain the coils of the machine within their slots as required, and it is a primary purpose of this invention to provide such slot wedging means.

Briefly, the invention relates to resilient or elastomeric slot wedging means which can be employed either to permanently retain coils of electrodynamic machines within their respective slots or which can be utilized to so retain such coils until the coils themselves are impregnated and coated with an insulating material which holds them permanently in place.

Figure 2:
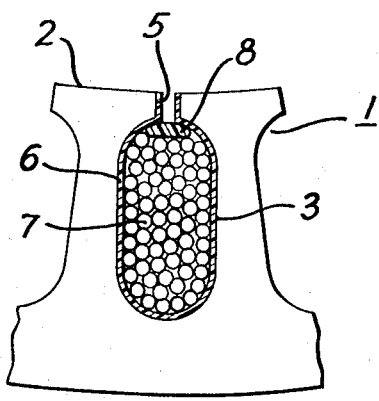

Those features of the invention which are believed to be novel are set forth with particularity in the claims appended hereto. The invention will, however, be better understood and further advantages and objects thereof appreciated from a consideration of the following description and the drawing, in which FIGURE 1 is a perspective view, partially in cross section, of a stator of an electro-dynamic machine showing the practice of the invention, and FIGURE 2 is a view taken in the direction 2—2 of FIGURE 1.

The slot wedging means of the present invention consists of resilient synthetic material in any of a number of shapes or forms. For example, the present wedging material can be in the form of cylinders, tubes, or slugs which are elliptical, round, rectangular or of any other shape in cross section, the tize of the wedge for any particular slot being so tailored that after being forced into the slot above the motor coil, it will expand resiliently beneath the teeth of the slot to firmly fix the coil in place and minimize movement and vibration of the coil conductors. The wedge can consist of any of a number of well known resilient materials, including such materials which are foamed or expanded. Among materials which have been found useful for the present purpose are resilient or expanded synthetic polyolefins, such as polyethylene, polypropylene and mixtures and copolymers of such various polyolefins, silicone rubbers, polystyrene, polyurethane, polyvinyl chloride, phenolics, urea formaldehyde, cellulose acetate, chlorinated and fluorinated hydrocarbons, polycarbonate resins and polyphenylene oxide resins, among others. Generally speaking, it has been found desirable to have the cross section of the present wedge material about two times the cross section of the area beneath the teeth and above the motor coil to be filled so that adequate confining pressure is asserted by the wedge. However, it will be realized that the cross-sectional area of the wedge can be varied widely to suit any particular condition. It has also been found that one slot wedge unit about 3/16 inch to 1/4 inch long for every one to 1 1/2 inches of slot length is adequate for slots having a face opening of from about 1/16 inch to 1/10 inch. This is particularly true for fractional horsepower motors. For larger motors, slugs or slot wedges of larger cross section, as well as a greater number of wedges per length of slot, can be used as indicated. The slot wedges can be inserted in the slots in any of a number of manners. In many cases where the wedges are particularly resilient, they are forced in through the slot opening itself. In other instances it is more convenient to force the wedge into the slot through a properly positioned barrel or tube which serves to compress the wedge until its cross-sectional area is smaller than that of the space available between the teeth lips and the top surface of the coil.

As pointed out above, the present slot wedges can be economically and advantageously used to retain permanently the coils of electrical machinery in place with ease and with a minimum of cost. The wedges being resilient do not tend to abrade the motor coils as do rigid slot wedges. Again, because of their resiliency any one size of wedge can be used for a number of sizes of slots and coils, effectively holding the coils in place and protecting them against vibration and abrasion. Since the wedges are not continuous and do not extend along the entire slot opening, they permit better circulation of air or cooling medium and reduce failure from overheating. The wedges also compact the end turns of stator windings so that little or no lacing of such end turns is required.

The present slot wedges are particularly useful in those cases where the motor coils are to be coated and impregnated with an insulating varnish or enamel or are to be treated with insulating powders. When liquid insulating varnishes or enamels are used, the non-continuous nature of the slot wedges permits ready impregnation of the coils so that complete insulation and bonding together of the conductors is attained, this in addition to the function of holding the coils below the slot teeth until the insulating material has been cured and hardened. Likewise, when the rotor or stator is to be treated by spraying with powder or dipping in a fluidized bed of powder, the non-continuous nature of the present wedges again provides for ready penetration and treatment of the coils. While permitting such ready impregnation of the coil, the wedges, by compressing the coil conductors closely together, allow impregnation with a minimum of impregnating material.

Reference is made to the drawing for a visual explanation of the invention. Shown in FIGURE 1 is a portion of a motor core 1 made up of a plurality of laminations 2 which define a coil slot 3 having face opening 4 and teeth 5. Placed within the slot 3 is a sheath 6 of insulation which can take the form of a separate insulating film of any well known insulating material such as resin-impregnated glass fabric, fiber, paper, asbestos, resin film or layer and the like or which may consist of a layer of resinous material applied by fluid bed or spray or liquid dipping methods. The coil 7 is placed in slot 3 and a slug 8 of the present wedging material placed by any desired means in the slot above the coil, the slug being compressed to fit the space within the slot above the motor coil and expanding after insertion as shown more particularly in FIGURE 2.

There is provided, then, by this invention improved means for effectively retaining in place the coils of electrical machinery, particularly such coils which tend, from electrically or mechanically induced vibrations, to migrate from their slots or abrade one against the other on the slot wall causing failure of the apparatus. The invention is applicable to form-wound as well as random-wound coils. The present wedges tightly wedge the coils in place either permanently where desired or temporarily to permit ready impregnation and bonding together and fixing in place of the coils as by varnish or powder treating means.

What I claim as new and desire to secure by Letters Patent of the United States is:

1. Slot wedging means for an electrical apparatus coil, said means consisting of a plurality of slugs of resilient material inserted at spaced intervals singly along the slot length between said coil and the slot teeth whereby said coil is held snugly in the slot.

2. Slot wedging means for an electrical apparatus coil, said means consisting of a plurality of slugs of resilient plastic foam material inserted at spaced intervals singly along the slot length between said coil and the slot teeth.

3. Electrical apparatus having at least one slot-contained coil, said coil being held in place by a plurality of slugs of elastomeric material located at spaced intervals singly along the slot length between said coil and the slot teeth.

4. A stator for electrical apparatus having at least one slot-contained coil, said coil being held snugly in place within said slot by a plurality of slugs of resilient material located at spaced intervals singly along the slot length within said slot between said coil and the slot teeth.

References Cited
UNITED STATES PATENTS

| 1,891,200 | 12/1932 | Eaton | 310—214 |
| 3,093,764 | 6/1963 | King et al. | 310—214 |

MILTON O. HIRSHFIELD, *Primary Examiner.*

L. L. SMITH, *Assistant Examiner.*

UNITED STATES PATENT OFFICE
CERTIFICATE OF CORRECTION

Patent No. 3,371,237                              February 27, 1968

Clairmont J. Herman

It is hereby certified that error appears in the above numbered patent requiring correction and that the said Letters Patent should read as corrected below.

Column 4, lines 18, 23, 27, 28 and 33, for "at spaced intervals singly", each occurrence, read -- singly at spaced intervals --.

Signed and sealed this 29th day of April 1969.

(SEAL)
Attest:

Edward M. Fletcher, Jr.                              EDWARD J. BRENNER
Attesting Officer                                         Commissioner of Patents